Oct. 21, 1941.    F. JOHN ET AL    2,260,252
FREE PISTON ENGINE
Filed Jan. 9, 1941    3 Sheets—Sheet 1

Inventors:
Fritz John and Adolf Steinbecher
By Paul Fischland
Attorney

Oct. 21, 1941.                F. JOHN ET AL                    2,260,252
                            FREE PISTON ENGINE
                          Filed Jan. 9, 1941            3 Sheets-Sheet 2
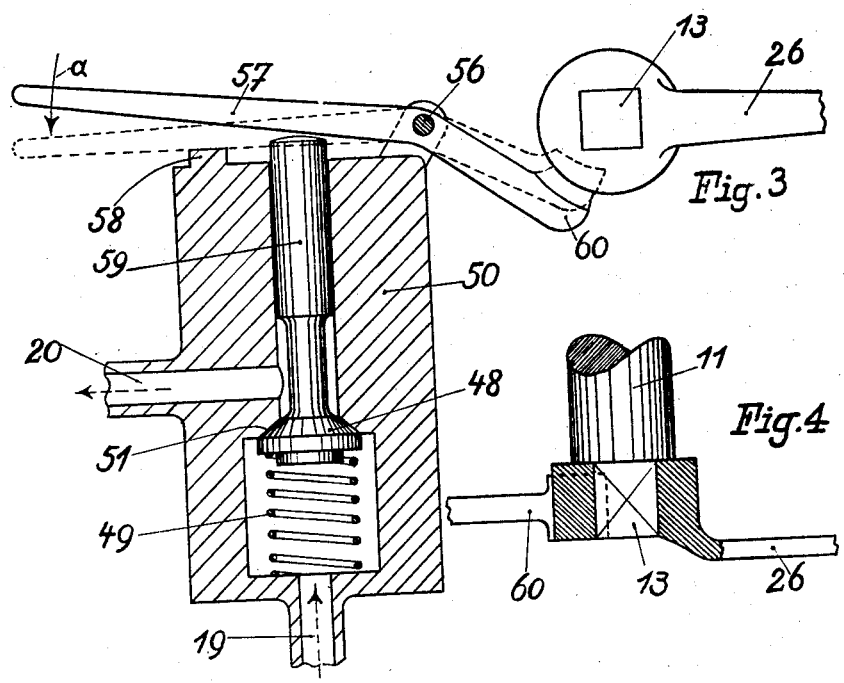
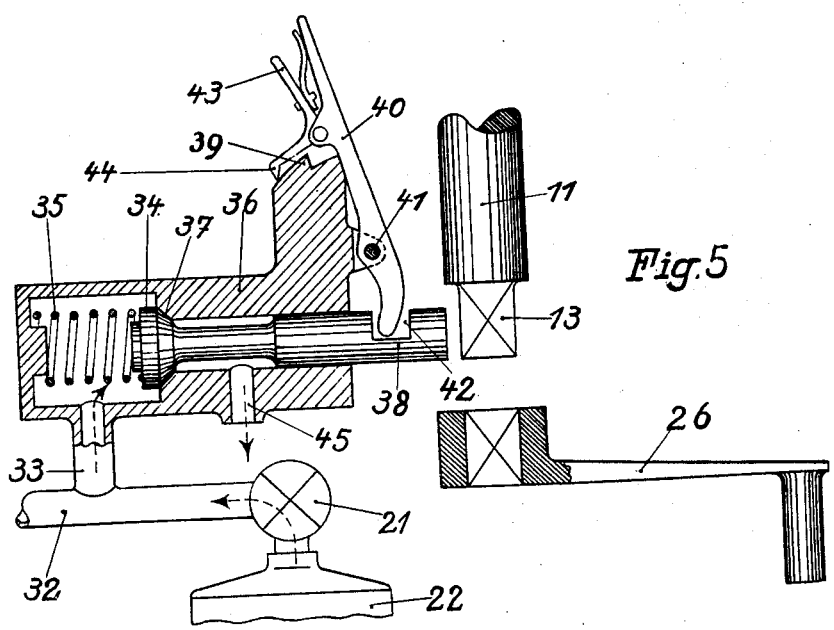
Inventors:
Fritz John and Adolf Heinbecher
by Paul Ferchland
Attorney Oct. 21, 1941.   F. JOHN ET AL   2,260,252
FREE PISTON ENGINE
Filed Jan. 9, 1941   3 Sheets-Sheet 3
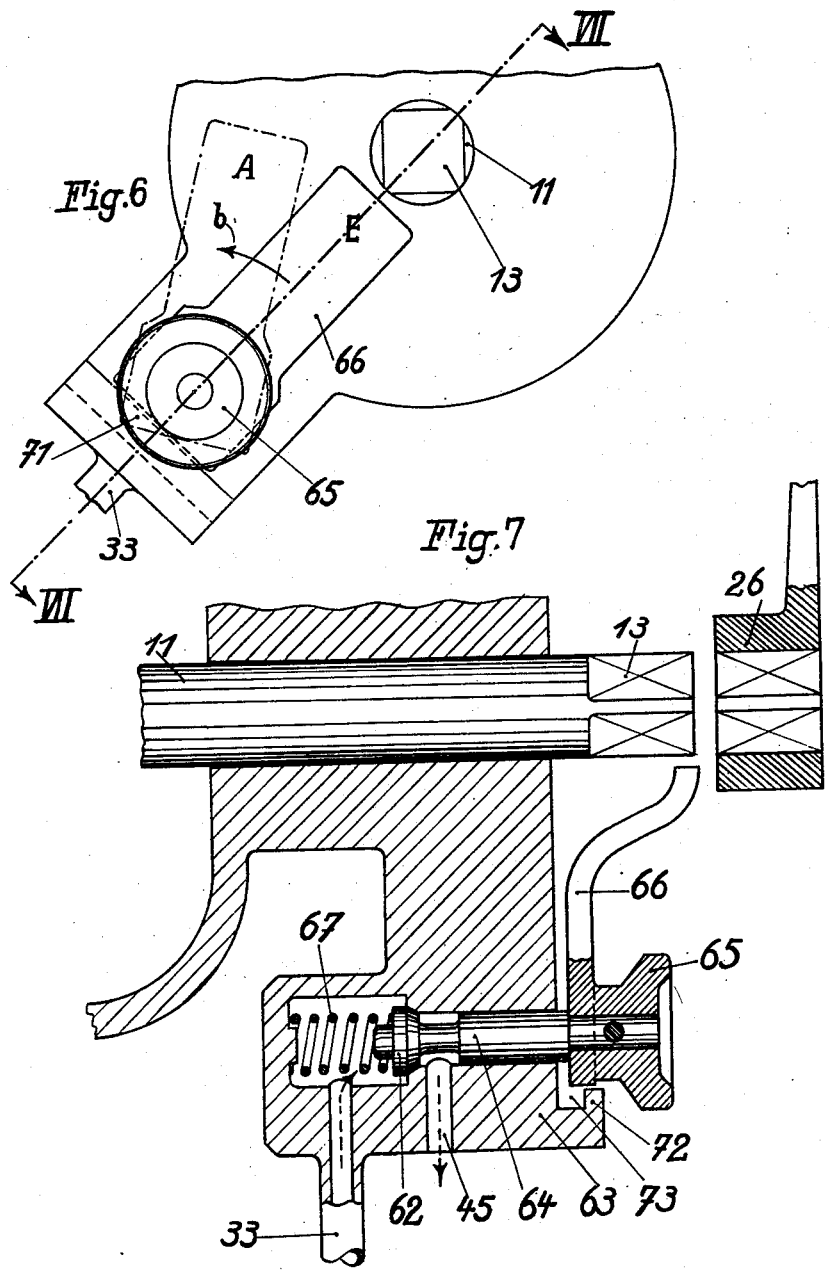

Patented Oct. 21, 1941

2,260,252

UNITED STATES PATENT OFFICE 2,260,252

FREE PISTON ENGINE

Fritz John and Adolf Steinbecher, Munich-Allach, Germany, assignors to the firm Forschungsanstalt Prof. Junkers Gesellschaft mit beschränkter Haftung, Munich-Allach, Germany Application January 9, 1941, Serial No. 373,776
In Germany January 6, 1940

7 Claims. (Cl. 230—56)

This invention relates to improvements in free-flying piston engines the flying mass of which is connected, over a gear transforming rotary into reciprocating motion, with a shaft to which a hand crank or other lever may be attached by means of which the shaft may be turned and the flying mass brought into starting position, whereupon the engine can be set in motion by admitting compressed air or other gas.

Engines of such construction hitherto involved dangers when the operator overlooked to remove the hand crank or the like from the shaft before the starting gas was allowed to enter the engine, because in this case the hand crank by swinging rapidly to and fro could cause accidents.

The object of the invention is to prevent such accidents. For this purpose a blocking device is provided which allows the admission of the compressed gas to the machine only after the hand crank or other lever has been removed from the machine.

According to the invention, in the compressed gas pipe leading to the free-flying piston engine or in a branch-pipe connecting the pressure pipe with the open air a shut-off member is arranged with which a member (blocking member) is rigidly or otherwise connected in such a manner that in the one position of the shut-off member in which the admission of compressed gas to the starting chamber of the machine is prevented, the blocking member is situated in such a manner that putting-on the hand crank or the like is possible, but in the other position of the shut-off member in which the starting chamber can be filled with the compressed gas the blocking member projects into the space which is occupied by the hand crank or the like when put on the shaft, so that the shut-off member can be brought into this position only when the hand crank or the like is removed from the shaft.

When the shut-off member is arranged in the compressed gas line itself, the arrangement must be such that this member can only be opened when the hand crank is removed from the shaft, but it must be closed at all times when the hand crank is put on the shaft.

When the shut-off member is provided in a branch-pipe leading from the compressed gas line to the open air, it must be opened when the hand crank is put on the shaft so that when in this case compressed gas is by mistake admitted to the starting line, this compressed gas can flow over the open shut-off member to the open air, and is thus prevented from setting the engine in motion. It should be possible to close this shut-off member only in the case that the hand crank is removed from the shaft.

The invention is illustrated in the annexed drawings of which

Figs. 2 to 7 show, on an enlarged scale, several modifications of the invention, to wit:

Fig. 2 is a longitudinal cross-section of a shut-off device provided in the compressed gas line, which member has the form of a slide and is displaceable by means of a hand crank;

Fig. 3 shows, in longitudinal cross-section, a valve likewise arranged in the compressed gas line;

Fig. 4 is a detail view, partly in cross-section, of the blocking member and the hand crank belonging to Fig. 3;

Fig. 5 shows, in longitudinal cross-section, a valve disposed in a pipe branching from the compressed gas line;

Figs. 6 and 7 show, respectively, a front-view and longitudinal cross-section on the line VII—VII (Fig. 6) of a valve likewise disposed in a pipe branching from the compressed gas line.

Figure 1:
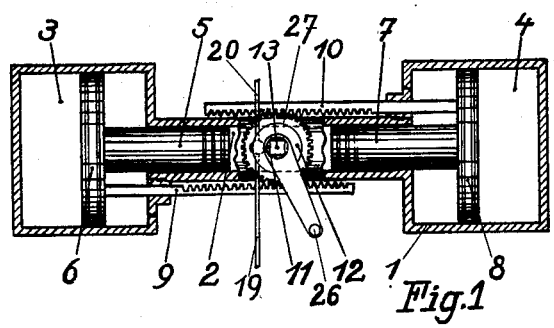
Fig. 1 is a longitudinal cross-section, partly elevation showing diagrammatically the general construction of a free-flying piston engine equipped with the safety device according to the invention.

Referring first to Fig. 1, 1 is the casing of a free-flying piston engine comprising an internal combustion cylinder 2 coaxially connected at both ends with two compression cylinders 3 and 4. In these cylinders two flying masses each of them consisting of motor pistons 5, 7 and compressor pistons 6, 8 are reciprocated in opposite directions. The flying masses 5, 6 and 7, 8 are connected with each other by a coupling gear in such a manner that they are forced to make corresponding opposite motions. In the example shown a rack and pinion gear is used for coupling, the masses 5, 6 being connected with the rack 9, and the masses 7, 8 with the rack 10. The teeth of these racks engage at diametrically opposed points the teeth of a cog-wheel 12 fixed on a shaft 11 journaled in the casing 1 of the engine. This shaft at its free end carries a square 13 on which a hand crank or other lever may be put.

For starting the free-flying piston engine the flying masses must be brought into or nearly into a dead position, for instance, into the outer dead position as regards the motor cylinder. This is effected by turning the hand crank mounted on the shaft 11 in the corresponding direction. After the flying masses have been brought into starting position, they are exposed to the action of compressed gas (for instance, air) by admitting the latter, for instance, into the compression chambers 3, 4. Hereby the flying masses are projected towards each other. The explosive charge which in the meantime was introduced into the combustion cylinder 2 is hereby compressed between the motor pistons 5, 7 and then ignited, so that the resulting combustion gases again drive asunder the flying masses. The engine is now set in motion and does its work (compressing air in the compression cylinders 3, 4) in the well-known manner.

Now if the operator when starting the engine had overlooked to remove the hand crank from the shaft 11 before the starting gas was admitted to the engine, the crank would take part in the rapid oscillation of the cog-wheel of the engine, so that persons present would be exposed to considerable danger. Moreover it might happen that the crank were pulled off from the shaft 11 and projected into the room. The possibility of such accidents is avoided by the devices described hereafter. Parts 19, 20, 26, 27 are described in connection with Fig. 2.

Figure 2:
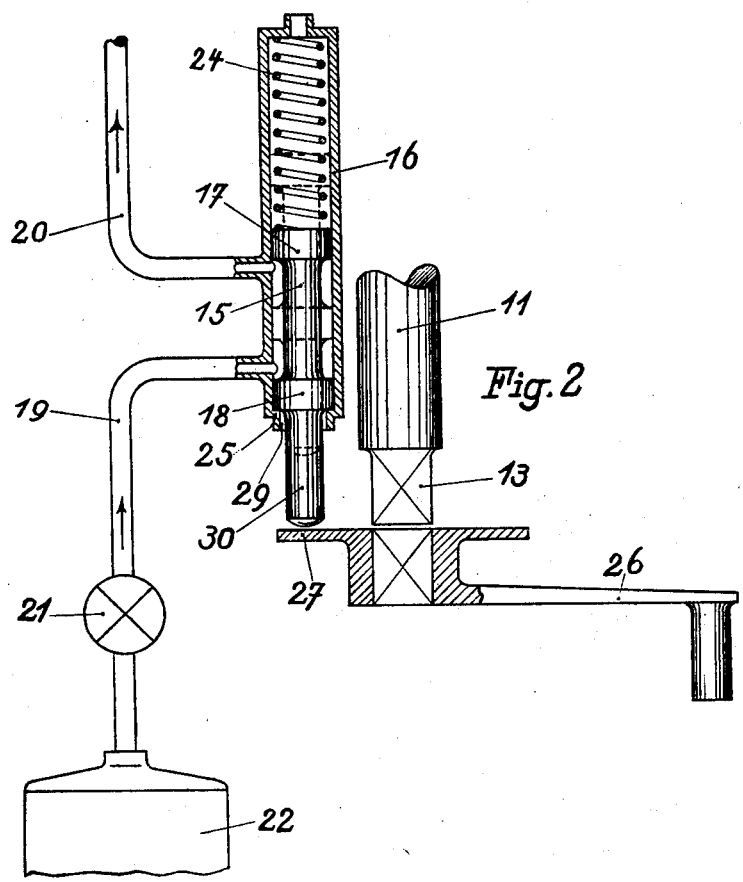

In the modification shown in Fig. 2 a slide 15 movable in a casing 16 is inserted as a shut-off member into the compressed gas line. Two pipes 19, 20 join at a distance with the slide casing, one of which, 19 comes from the source of compressed gas 22 and contains a shut-off member 21, whereas the other pipe, 20, leads to the starting chambers of the free-flying piston engine, for instance 3, 4 (Fig. 1). The slide is provided with two pistons 17, 18 tightly adjoining the inner wall of the casing and having a somewhat greater distance from each other than the orifices of pipes 19, 20. Therefore the compressed gas may flow freely from pipe 19 to pipe 20, when the pistons and orifices are in a symmetrical relative position, as shown in full lines, but the passage of the compressed gas is shut off when one of the pistons, e. g. 18 stands between the two orifices (as shown in dotted lines). A spring 24 tends to hold the slide pressed against an abutment 25 in the casing 16, i. e. in that position in which communication is effected between the pipes 19 and 20 over the part of the casing comprised between the orifices of these pipes. An extension 30 outwardly projecting from the casing 16 operates, as a blocking member, with the collar 27 on the hub of the hand crank 26.

When the hand crank 26 is put on the square 13 of the shaft 11 in order to be able to bring the flying masses 5, 6 and 7, 8 (Fig. 1) into their starting position, the collar 27 of the hand crank encounters the extension 30 of the slide 15 and shifts the latter into the position shown by dotted lines in Fig. 2, the piston 18 of the slide then taking a position between the pipes 19 and 20 so as to separate the latter. If now by mistake the valve 21 were opened and thereby gas under pressure admitted from the source of compressed gas 22, the admission of compressed gas to pipe 20 and therewith to the starting chambers of the engine would be prevented. This gas would rather escape into the open air through the annular slot 29 between the abutment 25 and the extension 30. Starting the engine is therefore impossible as long as the hand crank 26 is positioned on the shaft 11. The supply of compressed gas to the engine is only possible when the hand crank 26 is removed from the square 13, as only in this case the slide 15 can be brought, by the spring 24, into the position shown with full lines in Fig. 2 in which position the orifices of the pipes 19 and 20 communicate with each other.

In the modification shown in Figs. 3 and 4 a valve 48 is arranged in a housing 50 and pipes 19, 20 lead from the source of compressed gas over this valve to the engine as shown by dotted arrows. The body of this valve is normally held pressed onto its seat 51 by a spring 49. The valve may be opened by a two-armed lever 57 swinging about a stationary fulcrum 56. One arm 60 of this lever serves as a blocking member which is in such position with respect to the square 13, that the hand crank 26 can only be put on when the valve body 48 is closed (position shown in full lines) and that the valve can only be opened when the hand crank is withdrawn from the square (position shown in dotted lines). For opening the valve 48 the lever 57 is swung in the direction of the arrow a until it engages on the abutment 58. Hereby it encounters the valve stem and shifts it downwards together with the body 48. As long as the hand crank is positioned on the square 13, the end of the arm 60 gets so near to the hub of the hand crank that it is impossible to turn the lever 57 to open the valve 48. Therefore the engine cannot be started as long as the hand crank is positioned on the square 13.

In the modification shown in Fig. 5, a valve is arranged in a pipe 33 branching from the compressed gas line 32 in such a manner that the valve body 34 opening towards the source of compressed gas is normally held pressed by a spring 35 against its seat 37 in the valve casing 36, thus normally shutting off the valve outlet 45 leading to the open air. An extension 38 of the valve stem projecting from the casing 36 serves as blocking member and is closely adjacent to the square 13 of the shaft 11. When the valve is closed this member 38 is so near to the square 13 that it is impossible to put the hand crank 26 on the square 13. In this position the free-flying piston engine may be set in motion by opening the shut-off valve 21.

When it is desired to bring the flying masses into starting position, at first the valve body 34 must be brought into the "open position" against the action of the spring 35, in which position putting the hand crank 26 on the square 13 is not prevented by member 38.

For opening the valve body 34 a hand lever 40 swingable about a stationary fulcrum 41 is used which with its one end engages a recess 42 of the blocking member 38 and at its other end (the handle) carries a locking member consisting of an auxiliary lever 43 and a link 44. Furthermore a shoulder or rest 39 is provided for the link 44 in such a way that the link when engaging this shoulder fixes the valve body 34 in its open position. In this open position the distance between the member 38 and the square 13 is so great that the hand crank 26 can be put on the square. Now if by mistake the valve in the compressed gas line were opened to start the free-flying piston engine this would be harmless, as the compressed gas would be able to escape into the open air over the open valve 34, 37 and the outlet 45. In order to be able to start the engine, at first the hand crank must be removed again from the shaft 11 and then the valve 34, 37 must be closed.

The modification illustrated in Figs. 6 and 7 operates substantially in the same manner as that shown in Fig. 5, to wit a valve, opening toward a source of compressed air, is likewise inserted into a pipe 33 branching from the compressed gas line and leading through outlet 45 to the open air. The valve body 62 is permanently exposed to the action of a spring 67 tending to close it. On the valve stem 64 projecting outwards from the valve casing 63 a knob or handle 65 is keyed carrying a swing arm 66 which acts as a blocking member. This arm is swingable about the axis of the valve and is axially displaceable together with the valve body 62. In the one position E of this arm (shown in Figs. 6 and 7 in full lines) the valve 62 is in shut-off position, and the end of arm 66 is so near to the square 13 of the shaft 11 that the hand crank 26 cannot be put on the square 13. In this position of the arm 66 the engine may be started. To bring the flying masses of the engine into starting position, the valve body 62 is shifted into the open position by pressing the knob 65 against the force of the spring 67. Hereby a corner 71 projecting from the hub of the handle 65 is made to register with a groove 73 in the valve casing 63. By turning the handle 65 in the sense of the arrow b (Fig. 6) the corner 71 enters the groove 73 and engages the wall 72, whereby the valve body is secured in its open position. By this rotation the arm 66 has been brought into the position A shown in Fig. 6 in dotted lines in which position the hand crank 26 can be put on the shaft 11. Starting the engine is impossible in this case, because the compressed gas would escape into the open air through the opened valve and the orifice 45.

Also the shut-off member positioned in the compressed gas line may be a slide-valve. In this case the arrangement—contrary to what is shown in Fig. 2—must be such that the passage is free when the flying masses of the engine are to be brought into the starting position, and that the passage is shut off when the engine is to be started.

We claim:

1. In a free-flying piston engine the combination of a shaft, a gear for transforming rotary into reciprocating motion connecting said shaft with the flying piston, a hand crank adapted to be put on said shaft and to bring the flying piston into a position adapted to start the engine by gas under pressure, a source of compressed gas, a pipe connecting said source with the engine, and a displaceable member releasing from pressure, in its one position, the pipe connected with the engine, and, in its other position, effecting the blocking of the space for putting-on the hand crank.

2. In a free-flying piston engine the combination of a shaft, a gear for transforming rotary into reciprocating motion connecting said shaft with the flying piston, a hand crank adapted to be put on said shaft and to bring the flying piston into a position adapted to start the engine by gas under pressure, a source of compressed gas, a pipe connecting said source with the engine, a shut-off member in said pipe, and a blocking member connected with the shut-off member in such a manner that the space for putting-on the hand crank is blocked when the shut-off member opens the passage for the compressed gas, and inversely this passage is shut off when the space for putting-on the hand crank is free.

3. In a free-flying piston engine the combination of a shaft, a gear for transforming rotary into reciprocating motion connecting said shaft with the flying piston, a hand crank adapted to be put on said shaft and to bring the flying piston into a position adapted to start the engine by gas under pressure, a source of compressed gas, a pipe connecting said source with the engine, a pipe branching from this pipe and leading to the open air, a shut-off member in said branch pipe, and a blocking member connected with the shut-off member in such a manner that the space for putting-on the hand crank is free when the shut-off member opens the outlet for the compressed gas, and inversely this outlet is shut off when the space for putting-on the hand crank is blocked.

4. In a free-flying piston engine the combination of a shaft, a gear for transforming rotary into reciprocating motion connecting said shaft with the flying piston, a hand crank adapted to be put on said shaft and to bring the flying piston into a position adapted to start the engine by gas under pressure, a source of compressed gas, a pipe connecting said source with the engine, a valve inserted into said pipe comprising a housing, a slide therein consisting of two pistons connected with each other by a stem of smaller diameter leaving a channel between the pistons adapted to connect the inlet with the outlet of the pipe, an extension connected with one end of the slide and projecting outwards from the housing into the space required for putting-on the hand crank, and a spring tending to press said extension outwards, one of the pistons closing the inlet of the compressed gas pipe in that position of the slide in which the extension is pushed inwards by the hand crank.

5. In a free-flying piston engine the combination of a shaft, a gear for transforming rotary into reciprocating motion connecting said shaft with the flying piston, a hand crank adapted to be put on said shaft and to bring the flying piston into a position adapted to start the engine by gas under pressure, a source of compressed gas, a pipe connecting said source with the engine, a housing inserted into said pipe, a valve in the housing, a spring tending to close the valve towards the source of compressed gas, a hand-operated swing-arm adapted to open the valve in its one position and to block the space for putting-on the hand crank in the closed position of the valve and to give this space free in the opened position of the valve, said swing-arm itself being blocked by the hand crank as long as the latter is in position.

6. In a free-flying piston engine the combination of a shaft, a gear for transforming rotary into reciprocating motion connecting said shaft with the flying piston, a hand crank adapted to be put on said shaft and to bring the flying piston into a position adapted to start the engine by gas under pressure, a source of compressed gas, a pipe connecting said source with the engine, a pipe branching from the first-named pipe, a housing connected with the branch-pipe, a valve in this housing closing against the main pipe, the space after the valve communicating with the open air, a spring tending to keep the valve closed, a recessed extension of the valve body extending through the wall of the housing, a hand lever fulcrumed at a point of the housing and engaging said recess, and a ratchet adapted to hold the valve in open position, said extension blocking the space required for putting-on the hand crank.

7. In a free-flying piston engine the combination of a shaft, a gear for transforming rotary into reciprocating motion connecting said shaft with the flying piston, a hand crank adapted to be put on said shaft and to bring the flying piston into a position adapted to start the engine by gas under pressure, a source of compressed gas, a pipe connecting said source with the engine, a pipe branching from the first-named pipe, a housing connected with the branch-pipe, a valve in this housing closing against the main pipe, the space after the valve communicating with the open air, a spring tending to keep the valve closed, an extension of the valve body extending through the wall of the housing, a handle on said extension, a lever connected with the handle adapted to be turned to enter the space required for putting the hand crank on, the housing having a recessed projection whereby the lever is retained in the position in which it permits of the putting-on of the hand crank.

FRITZ JOHN.
ADOLF STEINBECHER.